(12) United States Patent
Fargo (10) Patent No.: US 6,202,793 B1
(45) Date of Patent: Mar. 20, 2001

(54) ELEVATOR MACHINE WITH COUNTER-ROTATING ROTORS

(76) Inventor: Richard N. Fargo, 12 Mohawk Rd., Plainville, CT (US) 06062

( * ) Notice: Subject to any disclaimer, the term of this patent is extended or adjusted under 35 U.S.C. 154(b) by 0 days.

(21) Appl. No.: 09/218,182

(22) Filed: Dec. 22, 1998

(51) Int. Cl.[7] .................................................. B66B 1/00
(52) U.S. Cl. ................................... 187/277; 187/256
(58) Field of Search .......................... 318/45, 47, 49, 318/51, 541; 187/277, 256, 258, 250

(56) References Cited

U.S. PATENT DOCUMENTS

| | | |
|---|---|---|
| 1,071,309 | 8/1913 | Goggin . |
| 1,237,321 * | 8/1917 | Fraser .................................. 187/256 |
| 1,750,237 * | 3/1930 | Mayer .................................. 187/258 |
| 3,101,130 * | 8/1963 | Bianca ................................. 187/256 |
| 3,127,957 * | 4/1964 | Nelson ................................. 187/256 |
| 3,586,938 * | 6/1971 | LeGall ................................. 318/49 |
| 4,375,047 * | 2/1983 | Nelson et al. ........................ 318/48 |
| 4,502,570 * | 3/1985 | Westerlund ......................... 187/22 |
| 4,755,700 * | 7/1988 | Yongning et al. ................... 318/49 |
| 4,949,815 | 8/1990 | Pavoz . |
| 5,429,211 | 7/1995 | Aulanko et al. . |
| 5,435,417 | 7/1995 | Hakala . |
| 5,469,937 | 11/1995 | Hakala et al. . |
| 5,490,578 | 2/1996 | Aulanko et al. . |
| 5,636,712 * | 6/1997 | Muller et al. ........................ 187/249 |

FOREIGN PATENT DOCUMENTS

| | | |
|---|---|---|
| 1 032 496 | 6/1958 | (DE) . |
| 296 15 921 U1 | 4/1997 | (DE) . |
| 0 606 875 A1 | 7/1994 | (EP) . |
| 0 688 735 A2 | 12/1995 | (EP) . |
| 0 710 618 A2 | 5/1996 | (EP) . |
| 0 749 931 A2 | 12/1996 | (EP) . |
| 0 779 233 A2 | 6/1997 | (EP) . |
| 0 784 030 A2 | 7/1997 | (EP) . |
| 0 749 930 A2 | 12/1997 | (EP) . |
| 2 640 604 | 12/1988 | (FR) . |
| 2 138 397 | 11/1985 | (GB) . |
| 2 201 657 | 8/1990 | (GB) . |
| 1-242386 | 9/1989 | (JP) . |
| WO 96/09978 | 4/1996 | (WO) . |

OTHER PUBLICATIONS

"Elevator Mechanical Design, Principles and Concepts", by Lubomir Janovsky, Ellis Horwood Limited (1987).

* cited by examiner

*Primary Examiner*—Jonathan Salata (57) ABSTRACT

An elevator drive machine having two counter-rotating rotors provides a lightweight, efficient machine that eliminates reaction torque on surrounding structures by directing reaction forces and driving forces to the elevator car being lifted.

8 Claims, 7 Drawing Sheets

ELEVATOR MACHINE WITH COUNTER-ROTATING ROTORS

FIELD OF THE INVENTION

The present invention relates to elevator machines and systems and, more particularly, to elevator machines and systems utilizing drive machines having counter-rotating rotors.

BACKGROUND AND SUMMARY OF THE INVENTION

High performance elevators require direct coupling between a motor and drive sheave in order to provide smooth, low vibration performance. The lack of a gearbox requires the machine to produce high torque at low operating speeds relative to industrial machines of the same power output rating. This results in motors that are large and expensive relative to industrial machines of the same power output.

The size and cost of conventional high-performance gearless machines makes it impractical to implement them in rope-climbing elevator designs, which are desirable for various reasons including optimization of hoistway space and convenient accessibility. Geared machines are undesirable for certain applications such as rope-climbing systems because they introduce vibrations and inefficiencies.

It is an object of the present invention to provide an elevator machine that includes the output and low vibration benefits of a high performance machine, while providing a lightweight and efficiency benefits of a gearless machine. This and other objects are achieved by the embodiments described herein.

The machine of the present invention utilizes a counter-rotating design that doubles the torque applied to lift an elevator for a given size motor, resulting in a motor that is approximately half the size of a motor used on a conventional, direct drive machine for the same duty. The use of counter-rotating drive sheaves eliminates reaction torque on the machine room floor, reducing structural requirements. This is due to the application of both the driving torque and the reaction torque to the elevator, compared to the application of the reaction torque to the machine room floor or other structure as with conventional machines. The machine is of sufficiently reduced size to be mounted on the counterweight and it eliminates reaction torque on the guide rails.

DESCRIPTION OF THE PREFERRED EMBODIMENTS

Figure 1:
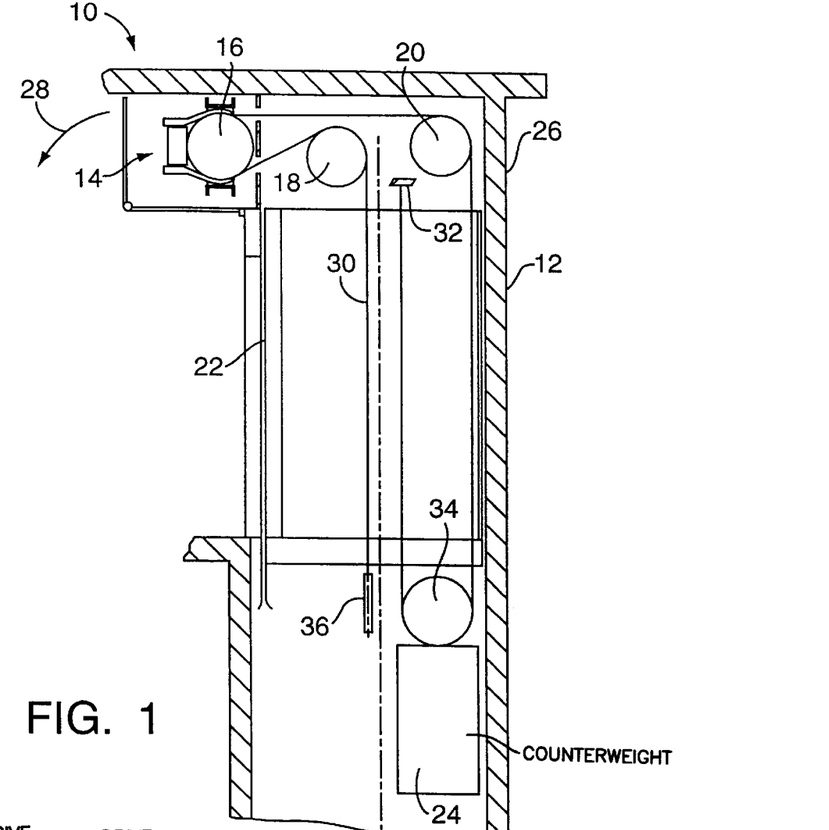
FIG. 1 is a schematic, partial side view of a conventional machine room-less elevator system.

Referring to FIG. 1, a conventional roping arrangement for a machineroomless elevator system (10) is shown. The elevator system (10) comprises a hoistway (12) extending generally vertically, an elevator machine (14) and drive sheave (16), first and second upper diverter pulleys (18, 20) fixed relative to the hoistway (12), an elevator car (22), and a counterweight (24). The drive sheave (16) and the drive machine (14) are positioned adjacent to the hoistway (12). The drive machine (14) is mounted near the top end (26) of the hoistway (12) by means of mounting brackets or other conventional means (not shown). The drive sheave (16) is adapted to rotate in two directions, including a counterclockwise direction as indicated by the arrow (28).

A drive belt or rope (30) is fixed relative to the hoistway (12) at a first end (32). Preferably, a flat rope (30) is used for optimum traction. The drive rope (30) extends downward and passes under a counterweight pulley (34) in order to suspend the counterweight (24). The drive rope (30) passes over the second diverter pulley (20) and extends generally horizontally to the drive sheave (16). The drive rope (30) passes around the drive sheave (16) and wraps around more than 180 degrees of the drive sheave (16), and then extends to the first upper diverter pulley (18). The drive rope (30) then passes over the first upper drive pulley (18) and extends downward to an elevator car pulley (36). The drive rope (30) then passes to a second elevator car pulley, not shown in the view of FIG. 1, adjacent to the first elevator car pulley (36) and wraps around it to suspend the elevator car (22). The drive rope extends upward from the second elevator car pulley along the side of the elevator car (22) not visible in FIG. 1 to a point (not shown) fixed relative to the hoistway (12).

Referring to FIG. 1, when the elevator machine (14) causes the drive sheave (16) to rotate in a counter-clockwise direction, the drive rope (30) is advanced in a direction from the fixed second upper drive sheave (20) to the drive sheave (16). This movement of the drive belt (30) causes the length of the drive belt (30) between the drive sheave (16) and the fixed end (32) of the rope (30) to shorten so that the counterweight (24) and the counterweight pulley (34) are raised vertically. At the same time, the length of the drive rope (30) between the drive sheave (16) and the other fixed rope end (not shown) is increased, so that the drive rope (30) passes over the first fixed upper pulley (18) and the increased length causes the elevator car (22) and the elevator car pulley (36) to be lowered vertically.

Figure 2:
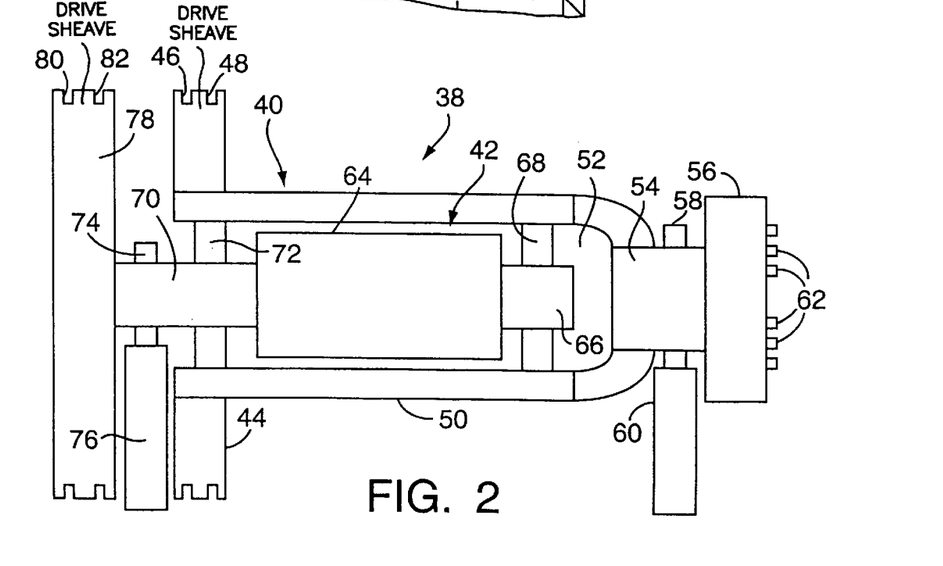
FIG. 2 is a schematic, side cross-sectional view of a first embodiment of a counter-rotating machine of the present invention.

Referring to FIG. 2, a counter-rotating machine (38) according to the present invention is illustrated schematically. The counter-rotating machine (38) comprises a primary motor (40) and a secondary motor (42). The primary motor (40) comprises a drive sheave (44) having two rope grooves (46, 48) about its circumference, a body (50) having a generally cylindrical internal cavity (52), a bearing axle (54), and a rotating weight section (56). The bearing axle (54) contacts a bearing (58) supported by a bearing stand (60) for relative rotation thereto. Slip rings (62) are provided on the surface of the rotating weight section (56).

The secondary motor (42) comprises a generally cylindrical shaped body (64) received concentrically within the primary motor body (50). The secondary motor body (64) is rotatably supported at a first end bearing axle (66) by a bearing (68), and at a second end bearing axle (70) by a bearing (72). The bearings (68, 72) are supported in the internal cavity (52) of the primary motor (40) so that the secondary motor (42) is positioned generally concentrically within the primary motor (40). The second end bearing axle (70) extends axially past the bearing (72) to a second, or outer, bearing (74) supported by a bearing stand (76).

The secondary motor (42) comprises a drive sheave (78) having two rope grooves (80, 82) about its circumference. The primary motor drive sheave (44) and the secondary motor drive sheave (78) are positioned for rotation about a common horizontal axis.

The primary motor (40) and secondary motor (42) are driven in a manner such that their respective drive sheaves (44, 78) are driven in counter-rotating direction. The secondary motor (42) is driven by conventional induction type electric motor means (not shown) and the primary motor (40) is driven through electrical contact with the slip rings (62) in a conventional manner.

Figure 3:
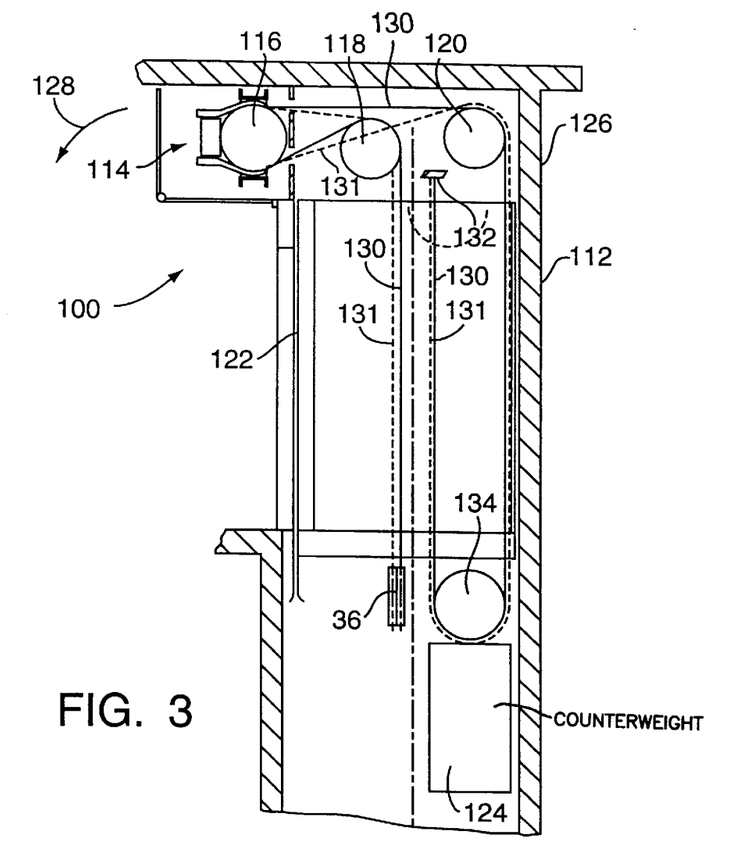
FIG. 3 is a schematic, partial side view of a first embodiment of an elevator system utilizing a counter-rotating machine of the present invention.

Referring to FIG. 3, an elevator system (100) employing a counter-rotating machine having two drive sheaves such as, for example, the one described with respect to FIG. 2, is illustrated. The roping arrangement is similar, in some respects, to that described with respect to FIG. 1. The elevator system (101) comprises a hoistway (112) extending generally vertically, a counter-rotating elevator machine (114) having a first drive sheave (116) and a second drive sheave (not shown), first and second upper diverter pulleys (118, 120) fixed relative to the hoistway (112), an elevator car (122), and a counterweight (124). The second drive sheave is not shown in FIG. 1 because it is adjacent to the first drive sheave (116) and located directly behind it in the view of FIG. 3. The drive sheaves (116) and the drive machine (114) are positioned adjacent to the hoistway (112). The drive machine (114) is mounted near the top end (126) of the hoistway (112) by means of mounting brackets or other conventional means (not shown). The drive sheaves (116) are adapted to rotate in two directions, including a counterclockwise direction as indicated by the arrow (128).

A pair of drive belts or ropes (130, 131) are fixed relative to the hoistway (112) at a first end (132). In FIG. 3, the first drive rope (130) is represented as a solid line and the second drive rope (131) is represented as a broken line. Preferably, flat ropes are used for optimum traction. The drive ropes (130, 131) extend downward and pass under a counter-weight pulley (134) in order to suspend the counterweight (124). The counterweight pulley (134) has two grooves (not shown), or may be a set of two independent, common-axis pulleys next to each other, to accommodate both drive ropes (130, 131). The drive ropes (130, 131) pass over the second diverter pulley (120) and diverge as shown. The first drive rope (130) extends generally horizontally to the top of the first drive sheave (116). The first drive rope (130) passes around the first drive sheave (116) and wraps around more than 180 degrees of the first drive sheave (116). It then extends from the bottom of the first drive sheave (116) to the top of first upper diverter pulley (118). The second drive rope (131) extends horizontally and downwardly from the second diverter pulley (120) to the bottom of the second drive sheave. It then passes under and around the second drive sheave before extending to the top of the first diverter pulley (118). The first and second diverter pulleys (118, 120) each have two grooves (not shown), or may each comprise a set of two independent, common-axis pulleys next to each other, to accommodate both drive ropes (130, 131).

After passing around the first diverter pulley (118), both drive ropes (130, 131) extend downwardly to an elevator car pulley (136). The drive ropes (130, 131) wrap around the elevator car pulley (136) and extend horizontally to a second elevator car pulley, not shown in the view of FIG. 3, adjacent to the first elevator car pulley (136). The drive ropes (130, 131) wrap around the first and second elevator car pulleys (136) to suspend the elevator car (122). The drive ropes (130, 131) extend upward from the second elevator car pulley along the side of the elevator car (122) not visible in FIG. 1 to a point (not shown) fixed relative to the hoistway (112).

Referring to FIG. 3, when the elevator machine (114) causes the first drive sheave (116) to rotate in a counter-clockwise direction and the second drive sheave (not shown) to rotate in a clockwise direction, the first drive rope (130) is advanced in a direction from the fixed second upper drive sheave (120) to the first drive sheave (116). This movement of the first drive belt (130) causes the length of the first drive belt (130) between the first drive sheave (116) and the fixed end (132) of the first drive rope (130) to shorten so that the counterweight (124) and the counterweight pulley (134) are raised vertically. At the same time, the length of the first drive rope (130) between the first drive sheave (116) and the other fixed rope end (not shown) is increased, so that the first drive rope (130) passes over the first fixed upper pulley (118) and the increased length causes the elevator car (122) and the first and second elevator car pulleys (136) to be lowered vertically.

Simultaneously, this movement of the second drive belt (131) causes the length of the second drive belt (131) between the second drive sheave and the fixed end (132) of the second drive rope (131) to shorten so that the counterweight (124) and the counterweight pulley (134) are raised vertically. At the same time, the length of the second drive rope (131) between the second drive sheave and the other fixed rope end (not shown) is increased, so that the second drive rope (131) passes over the first fixed upper pulley (118) and the increased length causes the elevator car (122) and the first and second elevator car pulleys (136) to be lowered vertically.

Thus, the first and second drive ropes (130, 131) concurrently raise or lower the elevator car (122) and counterweight (124) and share the load generally equally. The roping arrangement for each drive rope (130, 131) is essentially similar, and differs where necessary to accommodate the counter-rotating directions of the first and second drive sheaves of the counter-rotating drive machine (114).

Figure 4:
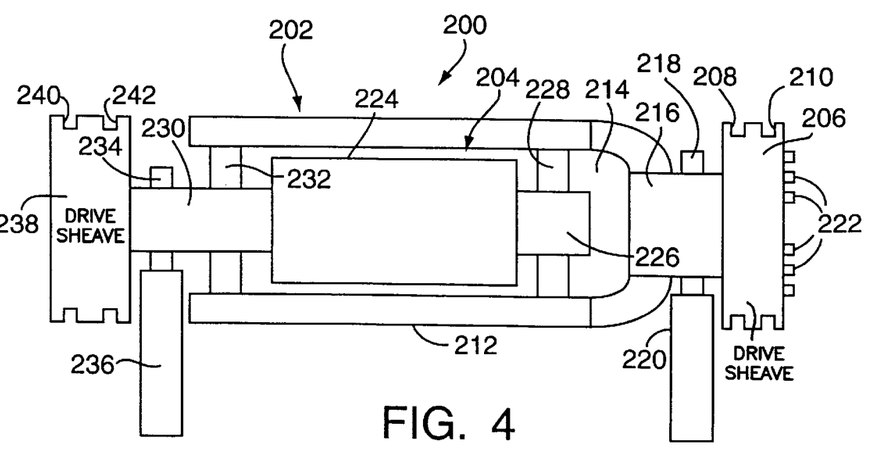
FIG. 4 is a schematic, side cross-sectional view of a second embodiment of a counter-rotating machine of the present invention.

Another embodiment of a counter-rotating machine (200) according to the present invention is illustrated schematically in FIG. 4. The counter-rotating machine (200) comprises a primary motor (202) and a secondary motor (204). The primary motor (202) comprises a drive sheave (206) having two rope grooves (208, 210) about its circumference, a body (212) having a generally cylindrical internal cavity (214), and a bearing axle (216). The bearing axle (216) contacts a bearing (218) supported by a bearing stand (220) for relative rotation thereto. Slip rings (222) are provided on the outer radial surface of drive sheave (206).

The secondary motor (204) comprises a generally cylindrical shaped body (224) received concentrically within the primary motor body (212). The secondary motor body (224) is rotatably supported at a first end bearing axle (226) by a bearing (228), and at a second end bearing axle (230) by a bearing (232). The bearings (228, 232) are supported in the internal cavity (2142) of the primary motor (202) so that the secondary motor (204) is positioned generally concentrically within the primary motor (202). The second end bearing axle (230) extends axially past the bearing (232) to a second, or outer, bearing (234) supported in a bearing stand (236).

The secondary motor (224) comprises a drive sheave (238) having two rope grooves (240, 242) about its circumference. The primary motor drive sheave (206) and the secondary motor drive sheave (238) are positioned for rotation about a common horizontal axis.

The primary motor (202) and secondary motor (204) are driven in a manner such that their respective drive sheaves (206, 238) are driven in counter-rotating direction. The secondary motor (204) is driven by conventional induction type electric motor means (not shown) and the primary motor (202) is driven through electrical contact with the slip rings (222) in a conventional manner.

Figure 5:
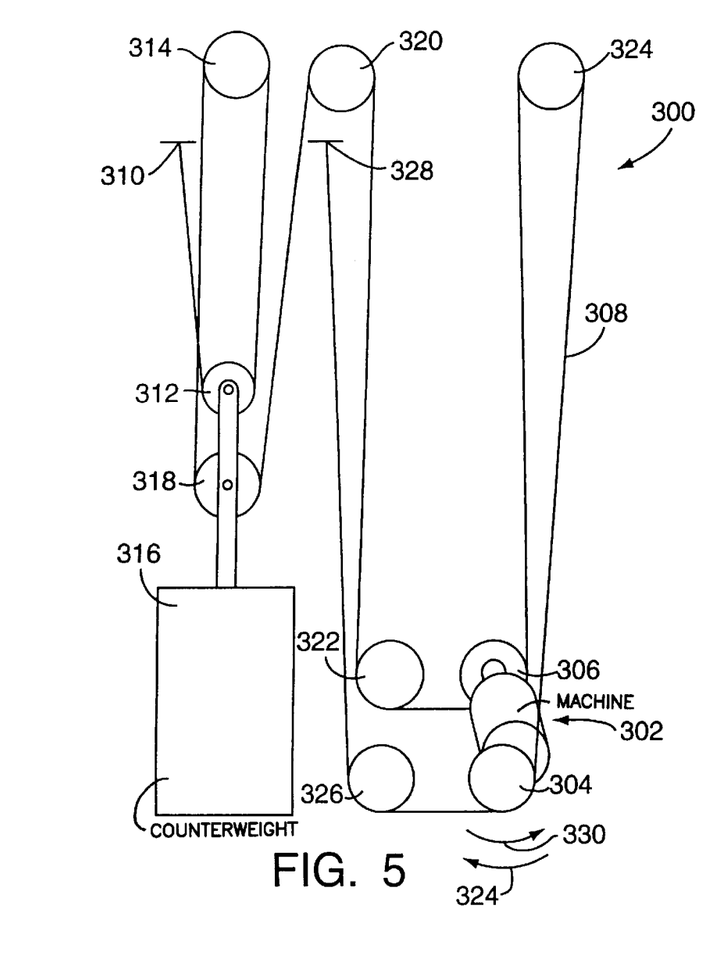
FIG. 5 is a schematic, partial side view of a second embodiment of an elevator system utilizing a counter-rotating machine of the present invention.

Referring to FIG. 5, another embodiment of an elevator system (300) according to the present invention is shown schematically. The elevator system (300) includes an elevator machine (302) of the type disclosed in FIG. 2 and FIG. 4 having counter-rotating drive sheaves (304, 306). A drive rope (308), preferably in the form of a high traction, flat rope or belt, is fixed at a first end (310) to a stationary structure such as the inside of a hoistway (not shown). The drive rope (308) extends downward from the first fixed end (310) and wraps around and under a first counterweight pulley (312) and extends upwardly to wrap over and around a first fixed pulley (314). The first fixed pulley (314) is fixed with respect to a stationary structure. The first counterweight pulley (312) is attached to a counterweight (316). The drive rope (308) extends downwardly from the first fixed pulley (314) to a second counterweight pulley (318), and wraps around and passes under the second counterweight pulley (318). The second counterweight pulley (318) is attached to the counterweight (316) so that the counterweight (316) is suspended from the drove rope (308) through the first counterweight pulley (312) and the second counterweight pulley (318). The drive rope (308) extends upwardly from the second counterweight pulley (318) to a second fixed pulley (320) and wraps around and over it, extending downward again. The second fixed pulley (320) is fixed to a stationary structure. The drive rope (308) extends downwardly from the second fixed pulley and wraps around and under a first elevator car pulley (322), extending generally horizontally therefrom to the second drive sheave (306). The drive rope (308) then extends upwardly to a third fixed pulley (324) which is fixed with respect to a stationary structure. The drive rope (308) wraps around and over the third fixed pulley (324) and passes downwardly to the first drive sheave (304). The drive rope (308) wraps around and under the first drive sheave (304) and extends horizontally therefrom to a second elevator car pulley (326). The drive rope (308) extends upwardly from the first drive sheave (304) to a point on a stationary structure where the second end (328) of the drive rope (308) is fixed.

The first and second drive sheaves (304, 306), the drive machine (302) and the first and second elevator car pulleys (322, 326) are fixed to an elevator car (not shown). Preferably, these components are fixed to the bottom of the elevator car. Because the pulleys are freely rotatable and the drive rope (308) frictionally engages the drive sheaves (304, 308), rotation of the drive sheaves (304, 306) will cause the elevator car and attached components to be raised vertically or lowered vertically depending on the direction of rotation of each drive sheave (304, 306).

With reference to FIG. 5, when the first drive sheave (304) is rotated in a counter-clockwise direction as indicated by the arrow (330) and the second drive sheave (306) is rotated in a clockwise direction as indicated by the arrow (332), the elevator car and attached components are raised vertically, while the counterweight (316) is simultaneously lowered. When the first drive sheave (304) is rotated in a clockwise direction as indicated by the arrow (334) and the second drive sheave (306) is rotated in a counter-clockwise direction as indicated by the arrow (336), the elevator car and attached components are lowered vertically, while the counterweight (316) is simultaneously raised. In correspondence to the roping configuration, the first drive sheave (304) and the second drive sheave (306) are geared in respective 1:1 and 3:1 ratios. The roping arrangement may also be configured for a 2:1 ratio system.

Because the drive sheaves (304, 306) are counter-rotating, there is no reaction torque applied to the elevator car. The drive rope (308) moves relative to the drive machine (302) concurrently in two opposed directions, at the same rate. Thus, the only force applied to the elevator car and attached sheaves is the lifting force delivered by the effective shortening of the drive rope (308) between the second fixed point (328) and the second fixed pulley (320).

Figure 6:
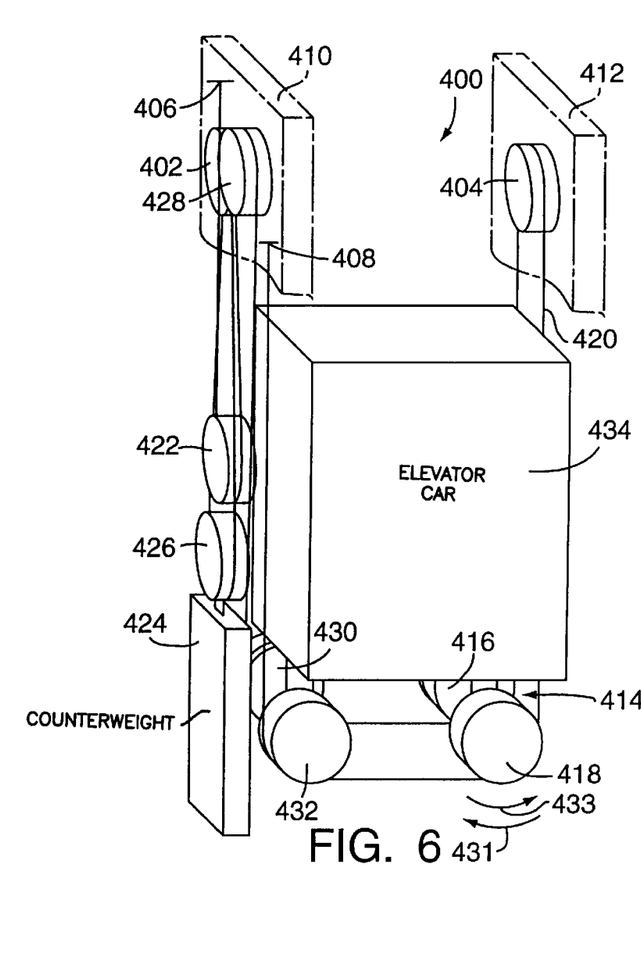
FIG. 6 is a schematic, partial side view of a third embodiment of an elevator system utilizing a counter-rotating machine of the present invention.

Another embodiment of an elevator system (400) according to the present invention is illustrated in FIG. 6. The elevator system (400) is configured so that the fixed pulleys (402, 428, 404) and the fixed rope ends (406, 408) are attached to the guide rails (410, 412).

Referring to FIG. 6, the elevator system (400) includes an elevator machine (414) of the type disclosed in FIG. 2 and FIG. 4 having counter-rotating drive sheaves (416, 418). A drive rope (420), preferably in the form of a high traction, flat rope or belt, is fixed at a first end (406) to a first guide rail (410). The drive rope (420) extends downward from the first fixed end (406) and wraps around and under a first counterweight pulley (422) and extends upwardly to wrap over and around a first fixed pulley (402). The first fixed pulley (402) is attached to the first guide rail (410). The first counterweight pulley (422) is attached to a counterweight (424). The drive rope (420) extends downwardly from the first fixed pulley (402) to a second counterweight pulley (426), and wraps around and passes under the second counterweight pulley (426). The second counterweight pulley (426) is attached to the counterweight (424) so that the counterweight (424) is suspended from the drive rope (420) through the first counterweight pulley (422) and the second counterweight pulley (426). The drive rope (420) extends upwardly from the second counterweight pulley (426) to a second fixed pulley (428) and wraps around and over it, extending downward again. The second fixed pulley (428) is fixed to the first guide rail (410) and positioned adjacent to the first fixed pulley (402). The drive rope (420) extends downwardly from the second fixed pulley (428) and wraps around and under a first elevator car pulley (430), extending generally horizontally therefrom to the first drive sheave (416). The drive rope (420) then extends upwardly to a third fixed pulley (404) which is fixed to a second guide rail (412). The drive rope (420) wraps around and over the third fixed pulley (404) and passes downwardly to the second drive sheave (418). The drive rope (420) wraps around and under the second drive sheave (418) and extends horizontally therefrom to a second elevator car pulley (432). The drive rope (420) extends upwardly from the second drive pulley (432) to a point on a stationary structure where the second end (408) of the drive rope (420) is fixed.

The first and second drive sheaves (416, 418), the drive machine (414) and the first and second elevator car pulleys (430, 432) are fixed to the elevator car (434). Preferably, these components are fixed to the bottom of the elevator car (434). Because the pulleys are freely rotatable and the drive rope (420) frictionally engages the drive sheaves (416, 418), rotation of the drive sheaves (416, 418) will cause the elevator car (434) and attached components to be raised vertically or lowered vertically depending on the direction of rotation of each drive sheave (416, 418).

With reference to FIG. 6, when the first drive sheave (416) is rotated in a clockwise direction as indicated by the arrow (431) and the second drive sheave (418) is rotated in a counter-clockwise direction as indicated by the arrow (433), the elevator car (434) and attached components are raised vertically, while the counterweight (424) is simultaneously lowered. When the first drive sheave (416) is rotated in a counter-clockwise direction as indicated by the arrow (433) and the second drive sheave (418) is rotated in a clockwise direction as indicated by the arrow (431), the elevator car (434) and attached components are lowered vertically, while the counterweight (424) is simultaneously raised. In correspondence to the roping configuration, the first drive sheave (416) and the second drive sheave (418) are geared in respective 3:1 and 1:1 ratios. The roping arrangement may also be configured for a 2:1 ratio system.

Because the drive sheaves (416, 418) are counter-rotating, there is no reaction torque applied to the elevator car (434). The drive rope (420) moves relative to the drive machine (414) concurrently in two opposed directions, at the same rate. Thus, the only force applied to the elevator car (434) and attached sheaves is the lifting force delivered by the effective shortening of the drive rope (420) between the second fixed point (408) and the second fixed pulley (404).

Figure 7:
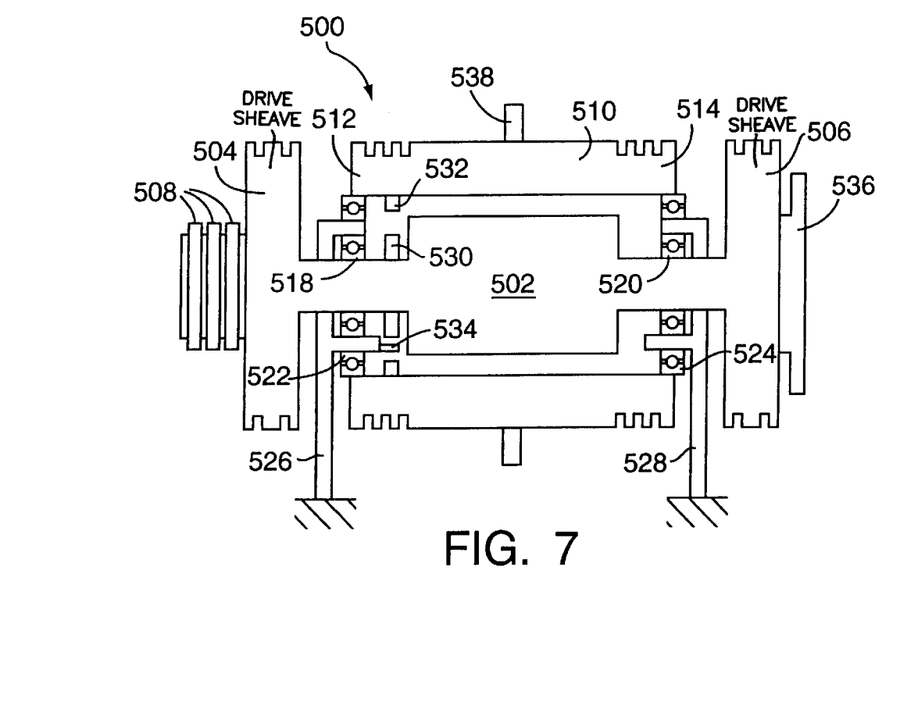
FIG. 7 is a schematic, side cross-sectional view of a third embodiment of a counter-rotating machine of the present invention.

Another embodiment of a present invention counter-rotating drive machine (500) is illustrated in FIG. 7. The drive machine (500) is a double-ended machine in which the internal rotor (502) has grooved drive sheaves (504, 506) at respective first and second ends. If desired, a single-ended system of like design may be implemented. Three phase slip rings (508) are attached to the inner rotor (504) for power transmission into the drive machine (500). The outer rotor (510) can be an induction "squirrel cage" or a permanent magnet device. If desired, power could be transmitted through slip rings to the outer rotor (510), ad the coupling between rotors could be reversed. The outer rotor (510) is also provided with grooved drive sheaves (512, 514) at respective first ad second ends. Inner bearings (518, 520) support the inner rotor (502) for rotation relative to the bearing stands (526, 528). Outer bearings (522, 524) support the outer rotor (510) for rotation relative to the bearing stands (526, 528). The inner rotor (502) is provided with an inner encoder disc (530) and the outer rotor (510) is provided with an outer encoder (532) which are tracked by an encoder reader (534) for measuring relative position between the inner and outer rotors (502, 510). The inner rotor (502) and the outer rotor (510) are provided with respective brake discs (536, 538).

Figure 8:
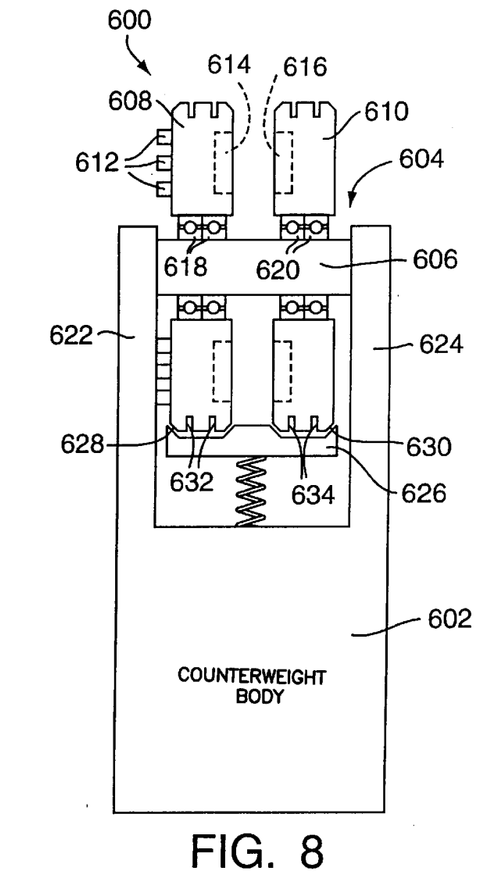
FIG. 8 is a schematic, cross-sectional view of an embodiment of a counter-rotating machine and counterweight assembly of the present invention.

Yet another embodiment of a present invention counter-rotating drive machine built integrally into a counter-weight is illustrated in FIG. 8. The counter-weight and machine assembly (600) includes a counterweight body (602) and a drive machine (604). The drive machine (604) is a conventional airgap machine. A stationary shaft (606) fixed at both ends to the counterweight body (602) rotationally supports the first and second rotors (608, 610). The first rotor (608) is provided with slip rings (612) for power transmission to the drive machine (604). A set of permanent magnets (614, 616) fixed to the first and second rotors (608, 610), respectively, transmit power to the second rotor (610). A set of bearings (618, 620) corresponding to each of the rotors (608, 610) support the rotors (608, 610) for rotation about the shaft (606). The shaft (606) is attached to the counterweight body (602) by support arms (622, 624). A wedge brake (626) is provided to cooperate with the beveled edges (628, 630) of the rotors (608, 610). Rope grooves (632, 634) are provided on respective rotors (608, 610).

Figure 9:
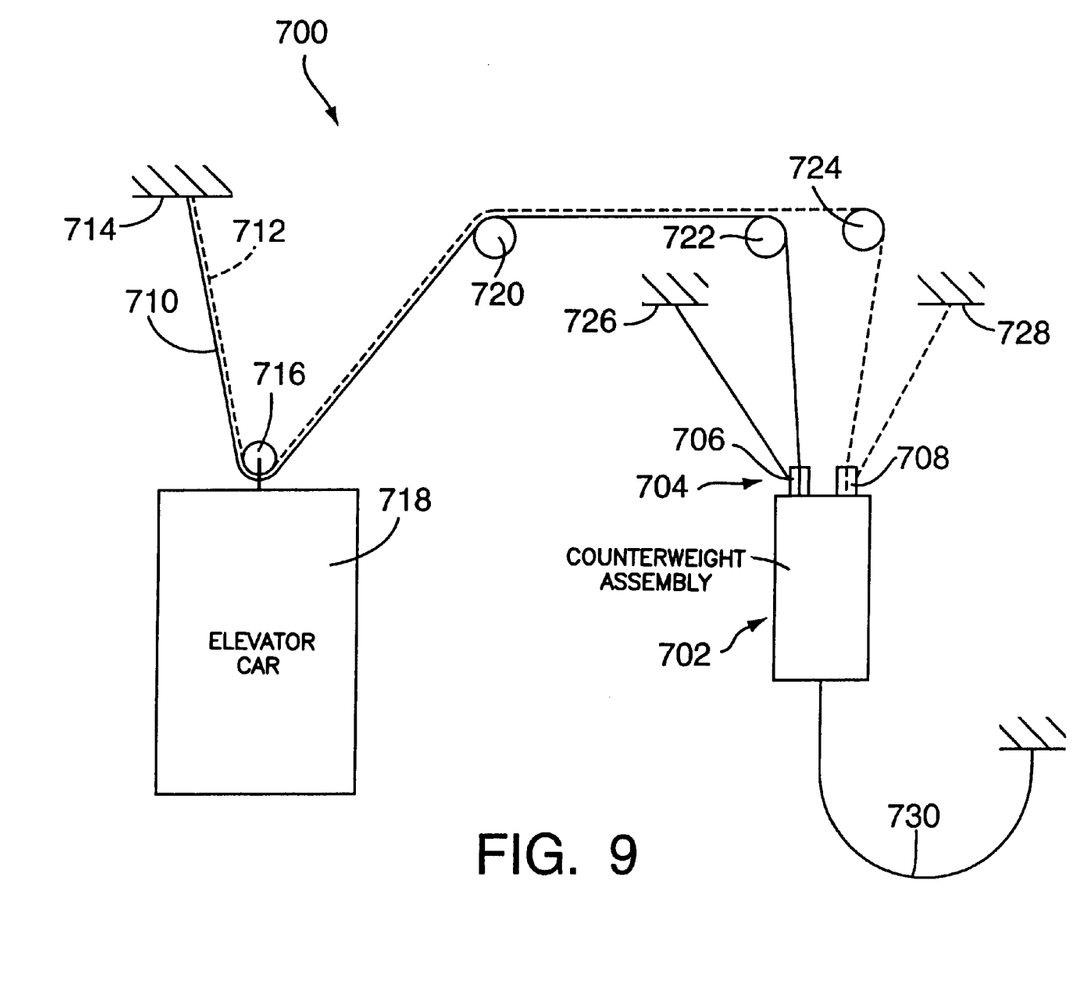
FIG. 9 is a schematic view of an elevator system utilizing a counter-rotating machine and counterweight assembly of the type illustrated in FIG. 8.

A fourth embodiment of an elevator system according to the present invention is schematically illustrated in FIG. 9. The elevator system (700) includes a counterweight assembly (702) having a counter-rotating drive machine (704) fixed thereto, such as one of the drive machines described with respect to FIGS. 7–8. The drive machine (704) includes a pair of counter-rotating drive sheaves (706, 708). The system utilizes two drive ropes, preferably flat ropes or belts, indicated by a solid line (710) and a broken line (712), respectively. A first end of each drive rope (710, 712) is fixed at a location (714) relative to a hoistway (not shown). Each drive rope (710, 712) extends downwardly to engage a double-grooved elevator car pulley (716) that is fixed to an elevator car (718). If desired, the elevator car pulley (716) may comprise a pair of pulleys adjacent to each other. The ropes (710, 712) extend upward to a first fixed pulley (720) and extend, individually, to one of second and third pulleys (722, 724). The first rope (710) wraps around the second pulley (722) and the second rope wraps around the third pulley (724). Each rope (710, 712) extends down to a respective one of the drive sheaves (706, 708). After wrapping around the respective drive sheave (706, 708) each rope (710, 712) extends upward to a respective fixed point (726, 728) that is fixed relative to the hoistway. The ropes (710, 712) wrap around respective drive sheaves (706, 708) in opposite directions, either clockwise or counter-clockwise, so that when the drive sheaves (706, 708) counter-rotate the counterweight assembly (702) is raised or lowered, causing the elevator car (718) to move in the opposite vertical direction. A traveling power cable (730) provides energy to the drive machine (704).

During acceleration, the component of torque required to accelerate the first and second rotors of the drive machine (704) may be different if the inertias of the two rotors are not equal. These different inertias result in different rope tensions. When the ropes (710, 712) from different drive sheaves (706, 708) pass over the idling pulley (720), or when they are terminated together, there is a transfer of force through the idling pulley (720) or terminal end which synchronizes the ropes (710, 712) and eventually the rotors.

Figure 10:
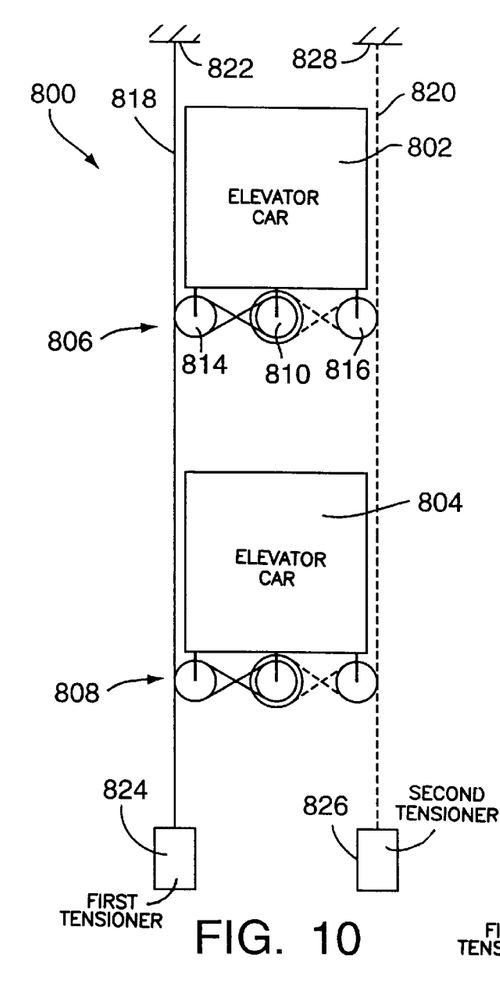
FIG. 10 is a schematic view of another embodiment of an elevator system utilizing a counter-rotating machine of the present invention.

A fifth embodiment of an elevator system according to the present invention utilizing a counter-rotating drive machine is illustrated schematically in FIG. 10. The elevator system (800) includes a pair of elevator cars (802, 804), each having a counter-rotating drive machine (806, 808). The drive machines (806, 808) are the same, so only one is illustrated in the bottom view of FIG. 11. The drive machine (806) includes first and second counter-rotating drive sheaves (810, 812). A respective idler pulley (814, 816) guides a plurality of drive ropes or belts (818, 820) around the bottom corner of the elevator car (802). Each set of ropes (818, 820) may comprise one or more drive ropes. With respect to FIG. 10, a first set of drive ropes is referred to as the first drive rope (818) and is represented by a solid line. A second set of drive ropes is referred to as the second drive rope (820) and is represented by a broken line.

The first drive rope (818) is fixed at a first end (822) with respect to a hoistway (not shown) and extends downwardly and around the first idler pulley (814) which is attached to the first elevator car (802). After passing under and around the first idler pulley (814), the first rope (818) passes over and around the first drive sheave (810). The first drive rope (818) then extends to the top of and over the first idler pulley (814) before extending downwardly. If a second elevator car (804) is included as shown in the embodiment of FIG. 10, then the first rope (818) cooperates with another set of idler pulley and drive sheave in the same manner a with the first elevator car (802). After the last elevator car (804), the first rope (818) extends downwardly and is attached to a first tensioner (824).

The second drive rope (820) interacts with the second idler pulley (816) and the second drive sheave (812) in a manner symmetrically opposed but similar to the first drive rope (818) until it terminates at a second tensioner (826).

The elevator cars (802, 804) can be raised or lowered in like manner as now described with respect to the first elevator car (802). When it is desired to raise the first elevator car (802), the first drive sheave (810) and the second drive sheave (804) are caused to rotate clockwise and counter-clockwise, respectively. The rotation of the drive sheaves (810, 812) causes the effective length of respective drive rope (818, 820) to decrease between the drive sheaves (810, 812) and the fixed ends (822, 828).

Figure 11:
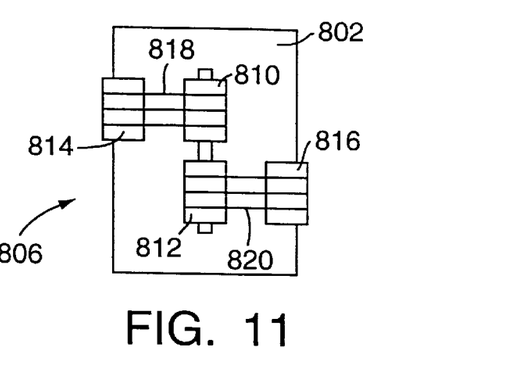
FIG. 11 is a schematic bottom view of a counter-rotating machine attached to an elevator car in accordance with the embodiment of FIG. 10.
Figure 12:
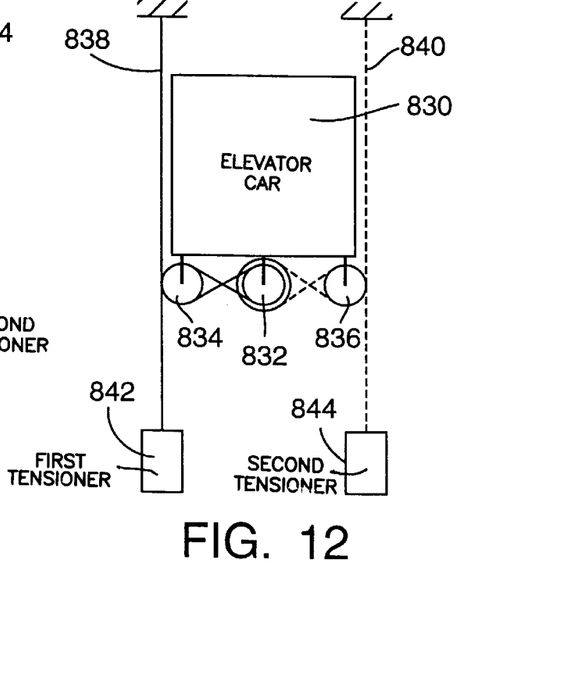
FIG. 12 is a schematic view of the embodiment according to FIG. 10, illustrating an alternative roping arrangement.

An alternative roping arrangement for a similar system to that illustrated in FIGS. 10–11 is shown in FIG. 12. According to the embodiment illustrated in FIG. 12, an elevator car (830) has a counter-rotating drive machine fixed thereto comprising a first (832) and second (not shown) drive sheaves and first and second idler pulleys (834, 836) arranged as described with respect to FIG. 11. The first drive rope (838) passes under both the first idler pulley (834) and the first drive sheave (832) before passing back over the two and down to the first tensioner (842). The second drive rope (840) passes under both the second idler pulley (836) and the second drive sheave (not shown) before passing back over the two and down to the second tensioner (844).

Figure 13:
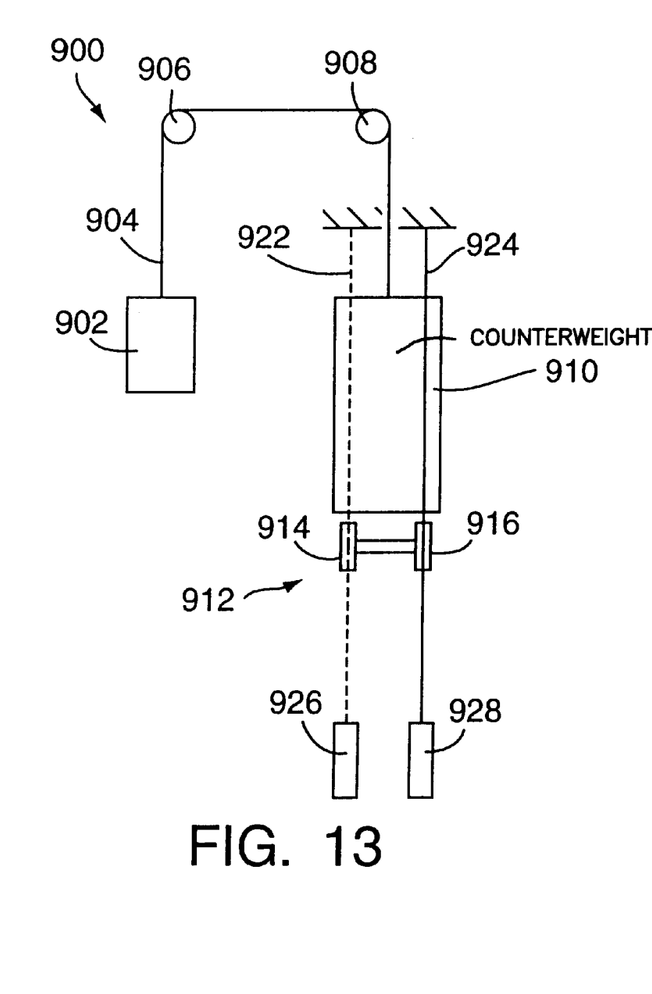
FIG. 13 is a schematic view of another embodiment of an elevator system utilizing a counter-rotating machine of the present invention.
Figure 14:
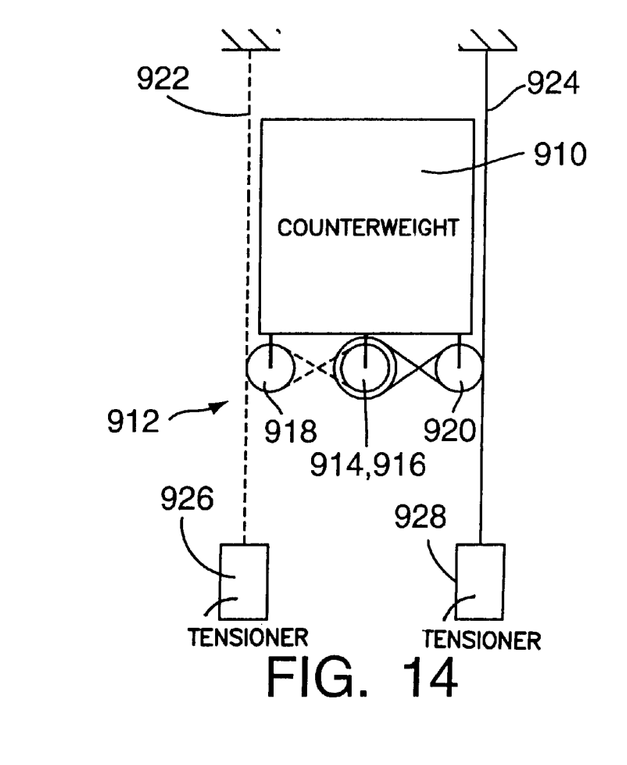
FIG. 14 is a schematic, partial side view of the embodiment according to FIG. 13.

A sixth embodiment of an elevator system including a counter-rotating drive machine according to the present invention is illustrated in FIGS. 13–14. The elevator system (900) includes an elevator car (902) attached to a rope or belt (904) that extends upwardly to engage and pass over first fixed pulley (906). The rope (904) extends to a second fixed pulley (908). The first and second fixed pulleys (906, 908) are fixed with respect to a hoistway (not shown). The rope (904) extends downwardly and attaches to a counterweight (910). The counterweight (910) has attached thereto a counter-rotating drive machine (912), such as the type described in the preceding embodiments. The drive machine (912) includes counter-rotating drive sheaves (914, 916) and idler pulleys (918, 920). A pair of first and second drive ropes (922, 924) are roped around the drive sheaves (914, 916) and idler pulleys (918, 920) in a manner similar to that shown in the embodiment of FIG. 10, as shown, or to that shown in FIG. 12. Tensioners (926, 928) are provided at the terminal ends of the drive ropes (922, 924).

While the preferred embodiments of the invention have been described, it is acknowledged that variation from the specific embodiments presented herein may be made without departing from the scope of the claimed invention.

What is claimed is:

1. A counter-rotating drive machine for an elevator system, said machine comprising
   a first rotor adapted to rotate about a central axis in a first rotational direction, said first rotor having an internal, generally cylindrical opening;
   a second rotor adapted to rotate, simultaneously with said first rotor, about said central axis in a second rotational direction which is opposite of said first direction, said second rotor being concentrically received within said generally cylindrical opening;
   a first drive sheave fixed to and adapted to rotate with said first rotor for delivering torque to an elevator drive rope; and
   a second drive sheave fixed to and adapted to rotate with said second rotor for delivering torque to an elevator drive rope.

2. A machine according to claim 1, further comprising
   a set of slip rings associated with one of said rotors for delivering energy to said machine; and wherein
   one of said rotors is driven by electrical energy applied to said slip rings and the other of said rotors is driven by induction.

3. A machine according to claim 1, wherein
   said first drive sheave and said second drive sheave are located at a common end of said machine so that said drive sheaves are adjacent to each other.

4. A machine according to claim 1, wherein
   said first drive sheave and said second drive sheave are located at opposite ends of said machine.

5. A counter-rotating drive machine and counterweight assembly for an elevator system, said assembly comprising
   a counterweight body;
   a first rotor mounted to said counterweight body and adapted to rotate about a central axis in a first rotational direction, said first rotor having an internal, generally cylindrical opening;
   a second rotor mounted to said counterweight body and adapted to rotate, simultaneously with said first rotor, about said central axis in a second rotational direction which is opposite of said first direction, said second rotor being concentrically received within said generally cylindrical opening;
   a first drive sheave fixed to and adapted to rotate with said first rotor for delivering torque to an elevator drive rope; and
   a second drive sheave fixed to and adapted to rotate with said second rotor for delivering torque to an elevator drive rope.

6. An assembly according to claim 5, further comprising
   a stationary axle fixed to said counterweight body, whereby said central axis is concentrically aligned with said axle.

7. An assembly according to claim 5, further comprising braking means for braking said first and second rotors.

8. An assembly according to claim 5, wherein
   said braking means comprises a unitary brake member having contact surfaces adapted to simultaneously contact and apply braking force to said first rotor and to said second rotor.

* * * * *